United States Patent Office 2,835,643
Patented May 20, 1958

2,835,643

AFTER TREATMENT OF A POLYVINYL CHLORIDE POLYMERIZATE CONTAINING HYDROPHILIC COLLOID

Hans Bauer, Joseph Heckmaier, and Herbert Reinecke, Burghausen, Upper Bavaria, Germany, assignors to Wacker-Chemie G. m. b. H., Munich, Germany, a corporation of Germany No Drawing. Application July 1, 1953
Serial No. 365,552

Claims priority, application Germany September 8, 1952

10 Claims. (Cl. 260—45.5)

This invention relates to the production of polymerizates and mixed polymerizates of vinyl chloride, and it has for its object to provide a novel and improved process for this purpose.

Another object of the invention is to provide a simple and efficient process for producing completely soluble polymerizates and mixed polymerizates of vinyl chloride.

Still another object is to facilitate and accelerate the suspension polymerization of vinyl chloride, either alone or in admixture with other monomers, by a special treatment which renders the suspension readily susceptible to centrifugation.

Various other objects and advantages will be apparent as the nature of the invention is more fully disclosed.

In the suspension polymerization of vinyl chloride alone and in admixture with other monomers, with water-insoluble catalysts such as benzoyl peroxide, and hydrophilic colloids containing hydroxyl groups such as polyvinyl alcohol as emulsifiers, polymerizates are generated which do not dissolve completely in solvents. This factor of poor solubility is undesirable, particularly for the introduction of mixed polymerizates of vinyl chloride on the varnish and glue sector, for the manufacture of spinning solutions from pure polyvinyl chloride or mixed polymerizates. The suspensions occurring according to the foregoing polymerization process are also often unsatisfactory for centrifugation purposes.

We have found that these shortcomings can be eliminated if the suspension of the polymerizate in water is treated with acetalizating means, such as aldehydes and/or ketones, and oxygen acids. Instead of the oxygen acids it is also possible to use mixtures of mineral acids with the salts of oxygen acids, such as potassium persulfate, sodium perchlorate, etc. By varying the type and concentration of the acetalization agent, and the temperature of treatment, the attainment of the effect may be shortened to a considerable extent.

It is true that German Patent #746,655 discloses how to obtain polymerizates soluble in organic solvents by means of subsequent treatment of stable emulsions of polyvinyl compounds with media through which the hydroxyl groups of the emulsifier are transformed into water-repellant groups. As acetalizing means there are used for this purpose, e. g. mineral acids (hydrochloric acid) and aldehyde. However, suspensions of polyvinyl compounds can be used in this manner only with difficulty, since the required reaction periods are very long, something like 24 to 48 hours, and therefore a tank material resistant to mineral acids is required.

With the use of a mixture of an aldehyde and/or ketone and an oxygen acid (or a mineral acid and a salt of an oxygen acid) the speed of the acetalization reaction is greatly accelerated and operating in vessels sensitive to hydrochloric acid, e. g. a vessel of $V_2A$ is possible.

Suitable aldehydes for the process according to our invention are, e. g. formaldehyde, acetaldehyde, propionaldehyde, butyraldehyde, diethylacetaldehyde, benzaldehyde, etc. A suitable ketone is, for instance, cyclohexanone. They are introduced in quantities of at least 0.03% (referred to the aqueous polymerizate suspension). Particularly suitable are quantities of 0.5 to 2%.

Suitable acids are oxygen-containing acids, such as perchloric acid, or mixtures of salts of oxygen-rich acids with mineral acids, such as a mixture of sulfuric acid and potassium persulfate. It is sufficient to acidify with them the aqueous polymerizate suspension, until a pH of about 1 is reached, for which 0.05 to 0.5% acids, calculated upon the aqueous polymerizate suspension, are required. Suitable operating temperatures are 0 to 100° C., preferably 30–60° C.

Example 1

To 100 kg. of a 30% aqueous suspension of a mixed polymerizate suspension, produced by the polymerization of 18 kg. vinyl chloride, 12 kg. vinyl acetate, 30 g. of benzoyl peroxide, 70 g. of partially acetylated polyvinyl alcohol of high viscosity with a saponification number of 100 and 70 kg. water at 40° C., there are added 500 g. of acetaldehyde and 200 g. perchloric acid and at 50° C. stirred for 6 hours. Then it is neutralized, the polymerizate mixture is separated from the main quantity of water by centrifugation, washed for a short time under centrifugation, and finally dried. A 20% solution of this polymerizate in ethyl acetate is clear and contains no insoluble swelling elements, whereas the mixed polymerizate produced without our foregoing subsequent treatment has very poor centrifugation qualities, and, after drying and dissolving, yields a turbid, swelly solution.

Example 2

100 kg. of 35% polyvinyl chloride suspension, obtained by polymerization of 35 kg. vinyl chloride, 65 kg. water, 65 g. partially acetylized high molecular polyvinyl alcohol with the saponification number 120, 25 g. lauryl peroxide, at 40° C., are mixed with 200 g. cyclohexanone, 400 g. 46% hydrochloric acid and 200 g. sodium perchlorate, and are stirred at 40° C. for 5 hours. After centrifugation, rinsing and drying a polymerizate is obtained which dissolves clearly in cyclohexanone, while polyvinyl chloride which had not been treated according to our invention yields a turbid, swelly solution.

Example 3

100 kg. of a mixed polymerizate suspension according to Example 1 are mixed with 500 g. potassium persulfate as well as 500 g. acetaldehyde and acidified with sulfuric acid to a pH value 1.0. At 50° C. the substance is stirred for 6 hours in a vessel plated with $V_2A$, then neutralized, the polymerizate removed by centrifugation and dried. The polymerizate is clearly soluble in acetic ester or acetone.

Although certain specific examples are set forth herein for purposes of illustration, it will be evident to those skilled in the art that the invention is capable of various modifications and adaptations within the scope of the appended claims.

The invention claimed is:

1. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with a member selected from the group consisting of acetalizing agents and ketalizing agents and a member selected from the group consisting of perchloric acid and persulfuric acid and salts of such acids at a pH of about 1.

2. The process of claim 1 in which said treatment of said aqueous dispersion is carried out at a temperature of 0 to 100° C.

3. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with an aldehyde and a member selected from the group consisting of perchloric acid and persulfuric acid and salts of such acids at a pH of about 1.

4. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with formaldehyde and a member selected from the group consisting of perchloric acid and persulfuric acid and salts of such acids at a pH of about 1.

5. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with acetaldehyde and a member selected from the group consisting of perchloric acid and persulfuric acid and salts of such acids at a pH of about 1.

6. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with propionaldehyde and a member selected from the group consisting of perchloric acid and persulfuric acid and salts of such acids at a pH of about 1.

7. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with butyraldehyde and a member selected from the group consisting of perchloric acid and persulfuric acid and salts of such acids at a pH of about 1.

8. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with diethylacetaldehyde and a member selected from the group consisting of perchloric acid and persulfuric acid and salts of such acids at a pH of about 1.

9. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with an aldehyde and perchloric acid at a pH of about 1.

10. A process for the after-treatment of an aqueous dispersion of a material of the group consisting of polyvinyl chloride and copolymers of vinyl chloride with another comonomer prepared by polymerizing the appropriate monomers in a suspension in water containing a water-insoluble catalyst and hydrophilic colloids containing hydroxyl groups, which comprises treating said aqueous dispersion with an aldehyde and a salt of perchloric acid at a pH of about 1.

References Cited in the file of this patent

UNITED STATES PATENTS

| 2,547,618 | Bisch et al. | Apr. 3, 1951 |
| 2,668,810 | Bergmeister et al. | Feb. 9, 1954 |

FOREIGN PATENTS

| 174,733 | Austria | Apr. 25, 1953 |
| 727,955 | Germany | Nov. 17, 1942 |
| 746,655 | Germany | Aug. 18, 1944 |